US007056367B2

(12) United States Patent
Trivett

(10) Patent No.: US 7,056,367 B2
(45) Date of Patent: Jun. 6, 2006

(54) METHOD AND APPARATUS FOR SCRUBBING GASES, USING MIXING VANES

(75) Inventor: Andrew Trivett, Charlottetown (CA)

(73) Assignee: Marine Exhaust Solutions Inc., Charlottetown (CA)

( * ) Notice: Subject to any disclaimer, the term of this patent is extended or adjusted under 35 U.S.C. 154(b) by 81 days.

(21) Appl. No.: 10/496,394

(22) PCT Filed: Nov. 28, 2002

(86) PCT No.: PCT/CA02/01846

§ 371 (c)(1),
(2), (4) Date: May 24, 2004

(87) PCT Pub. No.: WO03/045524

PCT Pub. Date: Jun. 5, 2003

(65) Prior Publication Data
US 2004/0255779 A1 Dec. 23, 2004

(30) Foreign Application Priority Data
Nov. 30, 2001 (CA) ................................ 2364100

(51) Int. Cl.
B01D 47/02 (2006.01)
B01D 53/18 (2006.01)
(52) U.S. Cl. ...................... 95/226; 95/227; 96/329; 96/333; 96/346; 96/280
(58) Field of Classification Search .................. 95/149, 95/226, 227, 229; 96/243, 329, 333, 346, 96/351, 356, 358, 280, 278, 279, 304
See application file for complete search history.

(56) References Cited

U.S. PATENT DOCUMENTS

| 1,013,368 | A | * | 1/1912 | Blomfeldt | ..................... 96/329 |
| 1,120,818 | A | * | 12/1914 | Johnson | ...................... 261/120 |
| 1,290,961 | A | | 1/1919 | Frank | |
| 1,940,034 | A | | 12/1933 | Wallace | |
| 2,004,467 | A | | 6/1935 | Hawley | |
| 2,405,494 | A | | 8/1946 | Dupuy | |
| 3,581,474 | A | | 6/1971 | Kent | |
| 3,620,510 | A | | 11/1971 | Longcore | |
| 3,640,513 | A | | 2/1972 | Bowie | |
| 3,693,433 | A | | 9/1972 | Kobor et al. | |
| 3,756,580 | A | | 9/1973 | Dunn | |
| 3,766,716 | A | | 10/1973 | Ruiz | |
| 3,811,252 | A | * | 5/1974 | Evans et al. | ................... 96/237 |

(Continued)

FOREIGN PATENT DOCUMENTS

CH 629 972 5/1982

(Continued)

Primary Examiner—Frank M. Lawrence
(74) Attorney, Agent, or Firm—Snell & Wilmer L.L.P.

(57) ABSTRACT

A scrubber for exhaust gases comprises a series of nested counter-flow passages including a hot plenum having a star-shaped section. Exhaust gases from the hot plenum surge through a liquid bath and flow in a reverse direction through an inclined array of flat, overlapping, spaced mixing vanes, causing turbulence in the exhaust gases and the formation of highly dispersed tiny bubbles, which enhance the solution of gaseous pollutants into the scrubbing liquid. Mist eliminator vanes strip entrained liquids from the exhaust gases. The hot plenum, reheats the exhaust gases to an unsaturated level. The scrubber is highly effective in reducing particulate matter, stripping sulphur dioxide and nitrogen dioxide from exhaust gases, and reducing the heat signature and visual evidence thereof.

20 Claims, 5 Drawing Sheets

U.S. PATENT DOCUMENTS

| | | | |
|---|---|---|---|
| 3,994,705 A | 11/1976 | Przewalski | |
| 4,041,759 A | 8/1977 | Palmer et al. | |
| 4,051,725 A | 10/1977 | Schloss | |
| 4,081,269 A | 3/1978 | Nomine et al. | |
| 4,091,075 A | 5/1978 | Pessel | |
| 4,174,630 A | 11/1979 | Nicoli | |
| 4,300,924 A | 11/1981 | Coyle | |
| 4,722,745 A * | 2/1988 | Pike | 96/257 |
| 5,201,919 A * | 4/1993 | Jahn et al. | 96/262 |
| 5,453,107 A * | 9/1995 | Liu | 96/344 |
| 6,210,468 B1 * | 4/2001 | Carson | 95/226 |
| 6,402,816 B1 | 6/2002 | Trivett et al. | |

FOREIGN PATENT DOCUMENTS

| | | |
|---|---|---|
| FR | 848 793 | 11/1939 |
| GB | 1 583 776 | 2/1981 |
| SU | 1 697 871 | 12/1991 |

* cited by examiner

METHOD AND APPARATUS FOR SCRUBBING GASES, USING MIXING VANES

FIELD OF THE INVENTION

This invention relates to a scrubber device for removal of particulate and gaseous impurities from exhaust gases produced by a combustion device, such as a diesel or other hydrocarbon fuelled engine. The exhaust gases are passed through a bath of scrubbing liquid containing and an inclined array of stationary mixing vanes which cause turbulence and the formation of finely dispersed bubbles, wherein the liquid/gas mixture enhances dissolution of impurity gases into the scrubbing liquid.

BACKGROUND OF THE INVENTION

Exhaust gases are generated in many industrial and transportation applications. Environmental concerns as well as industrial consequences of release of pollutants or contaminants require their elimination or reduction. In recent times there has been a greater emphasis on the reduction of pollutants emitted in smoke plumes, whether of factories, electricity generating stations, vehicles or ships. Similarly there has also been an emphasis on the removal, or conversion, of toxic chemicals emitted from industrial processes, whether in the pulp and paper, plastics, or other industries. There has also been a desire to reduce the heat emitted by engine exhaust systems, whether for the purpose of achieving greater economies by trapping and reusing waste heat for secondary and tertiary activities or for reducing the infra-red heat signature of an engine intended for military use. Further, a scrubber may, as one of its features, not only remove undesired elements, but may also reduce the noise of an exhaust flow.

There are many examples of specific instances when scrubbing is desirable. For example it may be desired to remove gaseous and fine particulate matter contaminants, odorous compounds and other undesirable elements from exhaust gases emanating from combustion of fossil fuels, whether gas, fuel oil, diesel oil and other petroleum products. The fuels are commonly used in marine diesel engines and boilers, as well as diesel engines used for transportation and construction equipment. Sulfur dioxide is a particular component of many processes involving combustion, ranging from thermoelectric generation, waste incineration, industrial processes, and exhaust gases of prime movers, including diesel engines. In some instances such as with forestry or mining equipment, use of a water scrubbing medium is also desired to discourage or eliminate spark emission.

In another field, it is desirable to scrub exhaust gases emanating from industrial processes such as chemical processes, heat transfer processes, food preparation, agricultural operations, mechanical parts cleaning, paint spray operations and similar processes. Similarly, it may be desired to treat products of the combustion of solid, liquid and gaseous fuels such as biomass, coal, coal water slurry, coal and limestone water slurry, coal methanol slurry. Further still, scrubbing may be required for products of combustion from incineration systems for the thermal destruction of solid, liquid or gaseous waste products. These can include industrial and municipal wastes, biomedical wastes, hazardous and pathological solid and liquid wastes, and solids and liquids contaminated with toxic, hazardous, and pathological wastes, accidental hazardous and dangerous waste spills, and similar waste products. Further still gas/water interaction may be used to clean and humidify exhaust gas for re-introduction of moist gas to the air intake of a combustion appliance for temperature control such as may be seen in a nitrogen oxide reduction scheme.

Scrubbers of various types are known. Removal of fine particles of dust, oxides of sulfur and nitrogen, odorous compounds, and similar contaminants from gas streams is a priority for environmental control abatement programs developed by regulatory agencies to minimize the impact of industrial processes on the natural environment by reducing acidification, ozone formation, nutrient generation and related adverse effects. Devices currently in use for removal of pollutants include cyclones, bag filters, electrostatic precipitators, and high energy scrubbers. Typically the input to output efficiency of these devices range from 85% to $\geq 99.99\%$, with the high energy scrubbers being the most efficient, and the cyclone and inertial separators the least. Input to output efficiency is defined as the total concentration of particles of all size ranges in the outlet gas stream from the system as a percentage of the concentration in the total input to the gas cleaning unit. In many combustion appliances, such as a diesel engine for example, the use of exhaust scrubbers is restricted due to the low available back pressure, necessitating a large, costly and unreliable exhaust gas blower.

The type of unit for a specific application is determined by a number of factors including type of industrial process, type and size of particle released, temperature of the gas stream, process economics, land use adjacent to the site, and a number of other factors. High energy scrubbers using limestone and water slurry scrubbing solutions have been successfully used to scrub sulphur from the combustion gases produced when burning sulfur containing fuels, such as coal, heavy fuel oil, and so on.

A common method of scrubbing, for example, exhaust gases, is to spray a scrubbing medium, such as water, across the exhaust gas passage, or to force the exhaust gases through a continuously fed curtain of water, or along a channel with wetted sides. These technologies for scrubbing fine particles from gaseous streams have relied on mechanical shear systems to produce large quantities of fine droplets of scrubbing solution. In each instance droplet surface area is the controlling parameter determining the efficiency of the scrubber. To increase scrubber droplet surface area for a given water mass, the average droplet diameter must decrease. The energy required to decrease the average droplet size and thus increase the average droplet surface area increases sharply. Thus the efficiency of conventional scrubbers for fine particle removal is a function of the energy input as measured by the pressure loss across the scrubber. Typical high efficiency scrubbers (>99% efficiency) operate with pressure drops in the range of 45–60 inches of water. Such units have high capital costs, and high energy and maintenance costs.

PRIOR ART

In contrast to the above conventional approach to scrubbing is the concept of forcing jets or streams of gas into baths of liquid. U.S. Pat. No. 4,300,924, to Coyle, issued Nov. 17, 1981, describes a device for scrubbing diesel engine exhausts by driving the exhaust gases through a straight pipe into a tank of water, and allowing the exhaust gases to bubble through the water. The Coyle apparatus operates when the head of the exhaust gases is sufficient to force them out the plain cut end of the pipe.

U.S. Pat. No. 6,402,816 to Trivett et al., issued Jun. 11, 2002, discloses a scrubber device having a header passage, a plurality of scrubber chambers and an exhaust passage, wherein the scrubber chambers direct exhaust gases downwardly into a liquid bath where the exhaust passes through a series of slots in the down pipe which impart angular or vortex motion in the bubbles as they rise. The gases are then passed through the demister and heat exchange pipes to remove scrubbing vapour before passing to the exhaust manifold.

Other scrubbers, such as that disclosed in U.S. Pat. No. 4,091,075 to Pessel, issued May 23, 1978, utilize aqueous chemical baths to react with pollutant gases, such as sulfur dioxide contained in exhaust or flue gases.

SUMMARY OF THE INVENTION

A scrubber for exhaust gases has an inlet from the source of gases, such as an engine system, connected through a series of nested counter-flow generally tubular passages, to an exhaust. Gases flowing from the inlet pipe continue in a counter-flow or reverse direction through a hot plenum. The hot plenum may have a convoluted or multi-lobed surface or, for ease of construction may be cylindrical. A bath of scrubbing liquid encloses the exit end of the hot plenum, whereby the exhaust gases surge through the liquid bath and again reverse direction to flow in a counter-flow direction through a tubular outlet plenum surrounding the convoluted hot plenum, whereafter the exhaust gases exit the scrubber. Optionally, wet sprays may also be included in the hot plenum to introduce scrubbing liquid to the exhaust gases prior to entry into the scrubbing bath. Hot exhaust gases have substantial buoyancy in water, and this buoyancy acts to drive the gas upwards through the bath of scrubbing liquid. If no further mixing or diversions are introduced, it has been noted that a large volume fraction of gas can pass through a system with little or no interaction with the scrubbing fluid. In the present invention, while passing through the liquid bath from the hot plenum, the exhaust gases are intercepted by a set of mixing vanes comprising an inclined array of flat, partially overlapping, stepped vanes which redirect the gases to flow between the vanes, causing turbulence in the exhaust gases. The vanes are sized and positioned so as to pass only a small fraction of the total exhaust gas flow through each slot, thereby forcing the gas to distribute and flow evenly between an array of mixing vanes.

As the mixing vanes are immersed in the liquid bath, the vanes cause turbulence in the mixture of exhaust gases and scrubbing liquid, causing the formation of highly dispersed fine bubbles, which enhance the solution of exhaust gas pollutants into the scrubbing liquid. The mixing vanes prevent the tendency of the gas buoyancy to keep the two gaseous and liquid media separate, as well as generating turbulent flow which aids in mixing, and thus material transfer from gas to water, vice-versa.

Particulate matter is also stripped from the exhaust gases in the scrubbing liquid, and collected at the base of the bath for removal. Scrubbing sprays can be positioned in the outlet plenum to dissipate the bubbles. Scrubbing sprays may also be placed in the hot inlet plenum to pre-quench the gas. The bath and sprays reduce the temperature of the exhaust gases. A further system of mist eliminator vanes are positioned across the outlet plenum to strip entrained scrubbing liquid from the exhaust gases which then pass through the remainder of the outlet plenum adjacent to the inner wall which is common with the hot plenum. The heat of the inner wall vaporizes any remaining liquids and raises the temperature and dew point of the gases. This system is highly effective in reducing particulate matter, stripping sulphur and nitrogen components from exhaust gases, and reducing the heat signature thereof.

In one aspect of the gas scrubber of the present invention, exhaust gases are scrubbed of particulate and gaseous contaminants by means of a bubble generating device of mixing vanes which creates a large quantity of tiny bubbles of exhaust gas within the liquid bath, thereby significantly increasing the surface area and contact between the exhaust gas and the scrubbing liquid, and enhancing the dissolution of contaminant gases such as $SO_x$ and $NO_x$ into the scrubbing liquid.

In another aspect of the invention, scrubbing is achieved through bubble generation with minimized back pressure on the engine system. Back pressure may be as little as two to eight inches of water.

In a further aspect of the invention, concentric or otherwise nested hot plenum and outlet plenum have a common wall of convoluted cross section providing an increased surface area between the two passages permitting increased heat exchange during the counter flow passage of exhaust gases. A convoluted or star-shaped wall dividing the hot plenum from the exhaust plenum allows upstream exhaust gases to heat the wall and transfer heat to the downstream exhaust gases exiting the outlet plenum. This reduces the degree of relative humidity of the exhaust gases, raising the dew point and reducing the incidence of subsequent condensation in the system.

In another aspect of the invention, a liquid bath of scrubbing liquid closes off the reversing passageway between the hot plenum and the outlet plenum, wherein the reversal of the gas flow direction initiates turbulence in the exhaust gases prior to passage through an array of mixing vanes.

These and other objects and features of the present invention will be understood from the following specification.

BRIEF DESCRIPTION OF THE DRAWINGS

The principles, and the method of operation of the present inventive apparatus, are explained hereafter in the context of exemplary and non-limiting embodiments of the invention, with the aid of drawings in which.

DETAILED DESCRIPTION OF THE INVENTION

Figure 1:
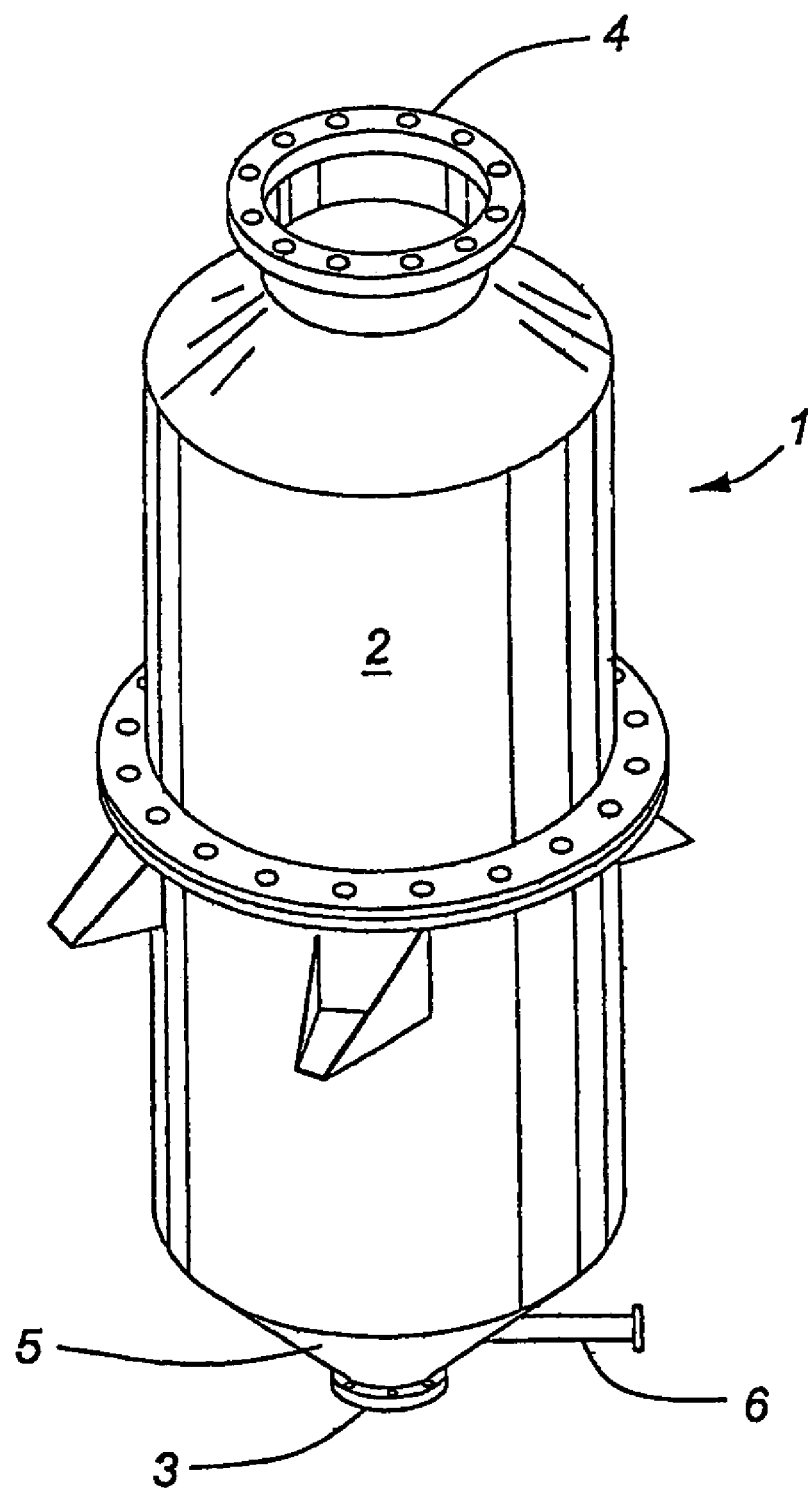
FIG. 1 is an isometric view of the scrubber embodying the present invention.

The description which follows, and the embodiments described therein, are provided by way of illustration of examples of particular embodiments of the principals of the present invention. These examples are provided for the purpose of explanation, and not of limitation, of those principals and of the invention.

In the description which follows, like parts are marked throughout the specification and drawings with the same respective reference numerals.

Referring to FIG. 1, the scrubber device 1 generally may comprise a scrubber body 2 having an inlet 3 for the introduction of exhaust gases and an outlet 4 from which the exhaust gases are discharged. Body 2 may be cylindrical or of other appropriate shape. A generally conical or V-shaped tank portion 5 forms a reservoir for a scrubbing liquid. Tank 5 contains a scrubbing liquid which, depending upon the nature of the exhaust gases and the application of the scrubber, may be a solvent for gas born contaminants, and in many applications may preferably be water. It has been found that in maritime applications, sea water is an effective scrubbing solution. Both the scrubbing liquid and residue from the scrubbing operation may be evacuated from scrubber 1 through the drain pipe 6. As may be seen in FIG. 2, a secondary tank 7 may be positioned around tank 5 to collect overflowing scrubbing liquid. A secondary outlet 8 may be used to remove excess liquid from tank 7. Not shown are ancillary piping for supply of scrubbing liquid to the scrubber device.

Figure 2:
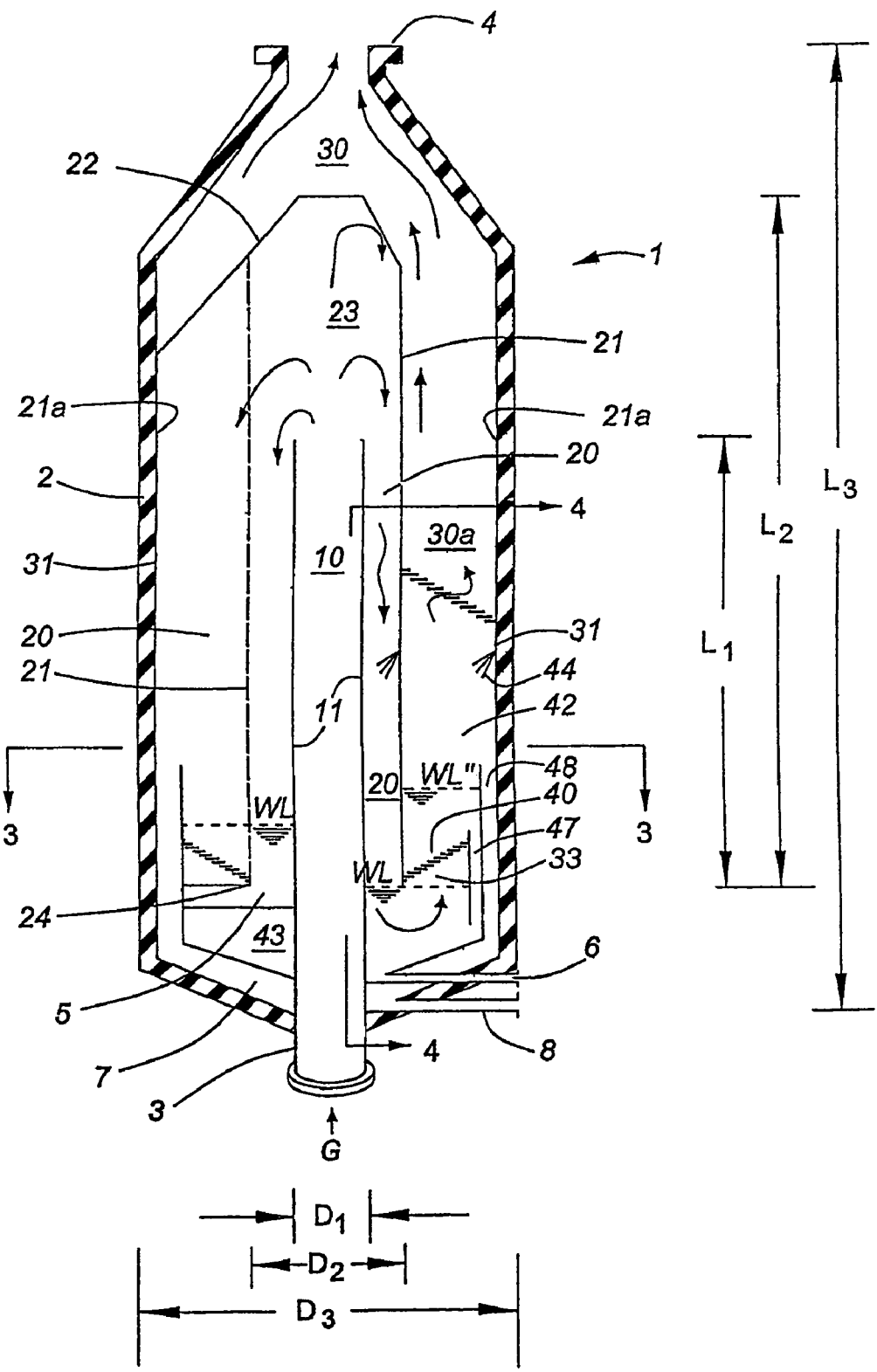
FIG. 2 is a vertical cross-section of the scrubber taken along the line 2—2 of FIG. 3.

As may be seen in FIG. 2, the internal components of the scrubber 1 are illustrated in vertical cross section. Exhaust gases, for example gases from the exhaust of an internal combustion engine, enter scrubber 1 at inlet 3, in the direction indicated by arrow G. Exhaust gases typically contain both particulate matter (soot) and gaseous impurities resulting from combustion. The particulates maybe carbonaceous, or hydrocarbon, while the gas may include $SO_x$ and $NO_x$ and in particular may include $SO_2$. The gases are conveyed through inlet passage 10 defined by wall 11. Passageway 10 may be tubular, having a length $L_1$ and a diameter $D_1$. At the exit of passage 10, the exhaust gases enter a hot plenum 20 defined by cylindrical, convoluted or multi-lobed side walls 21. As may be seen from FIG. 3, the side walls are preferably of a convoluted or star shape to increase the surface area of the plenum. There are eight star convolutions or arms of generally V-shape extending radially outwardly in the illustration of FIG. 3, but depending on the specific application requirements and size there may be only four arms, or many more. A tubular (circular) hot plenum could be used as shown in phantom as 21', but with the consequent reduction of surface area. The V-shaped arms are truncated by end walls 21a on each arm. Preferably, end wall 21a is directly connected to the outer wall to the scrubber.

The passageway of hot plenum 20 is closed at its inlet end by an end wall 22 of is appropriate shape, (i.e. a star-shaped cross section, for the star plenum 21, or a cone for a circular plenum 21') thereby defining an upper chamber 23. Gases exiting inlet 10 are redirected by the end 22 of chamber 23 and flow in a counter-flow direction (downwardly in FIG. 2) along the passageway of hot plenum 20. Chamber 23 is of sufficient length to minimize back pressure on the exhaust supply resulting from redirection of the gas flow down plenum 20. The chamber also serves to reduce resonance in the scrubber. Walls 21 of the hot star-shaped plenum terminate at a peripheral horizontal edge 24 or lip 24 within the periphery of scrubbing liquid tank 5.

An outlet plenum 30 surrounds the hot plenum 20 and is generally confined by the cylindrical outer wall of the scrubber. Outlet plenum 30 is defined by an outer wall 31 and the star-shaped inner wall 21 of hot plenum 20, and therefore exhibits a greater surface area of wall 21. In the preferred embodiment of the scrubber design, end walls 21a of hot plenum wall 21 may be sealed against wall 31, but alternatively, they may simply be braced intermittently against wall 31. If sealed, then a plurality of passages 30a are defined for the outer plenum until joining into a single plenum adjacent the exit 4. Conversely, if only intermittently braced, then the plurality of passageways 30a are in fact interconnected to create a single outer plenum with a convoluted inner surface. In a scrubber using a circular wall 21', outlet plenum 30 is annular. An apertured distributor plate (not shown) may be used at the base of plenum 30, to re-direct exhaust gases through a series of apertures into the annular outlet plenum 30. Plenum 30 directs the exhaust gases in a direction counter-flow to that of hot plenum 20, and conveys scrubbed gases out through to exit 4.

Figure 3:
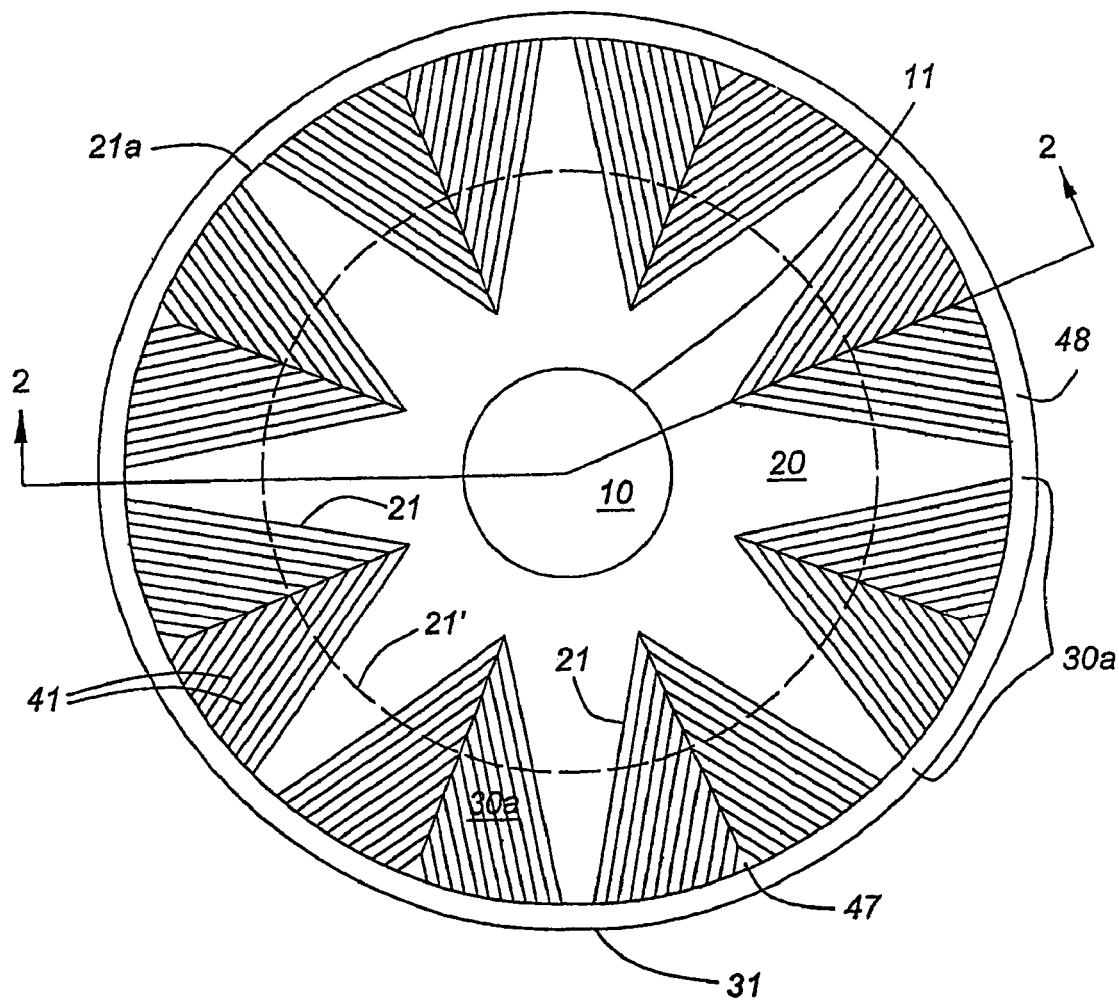
FIG. 3 is a horizontal cross-section taken along the line 3—3 of FIG. 2.

As may be seen from FIGS. 2 and 3, the exhaust gases are directed through inlet passage 10, then counter flow through hot plenum 20 then again counter-flow through outlet plenum 30 to exit the scrubber at outlet 4.

The scrubbing liquid is contained in bath 5 and has a liquid level at rest, WL, which covers the horizontal peripheral lip 24 and the mixing vanes discussed hereafter.

Figure 4:
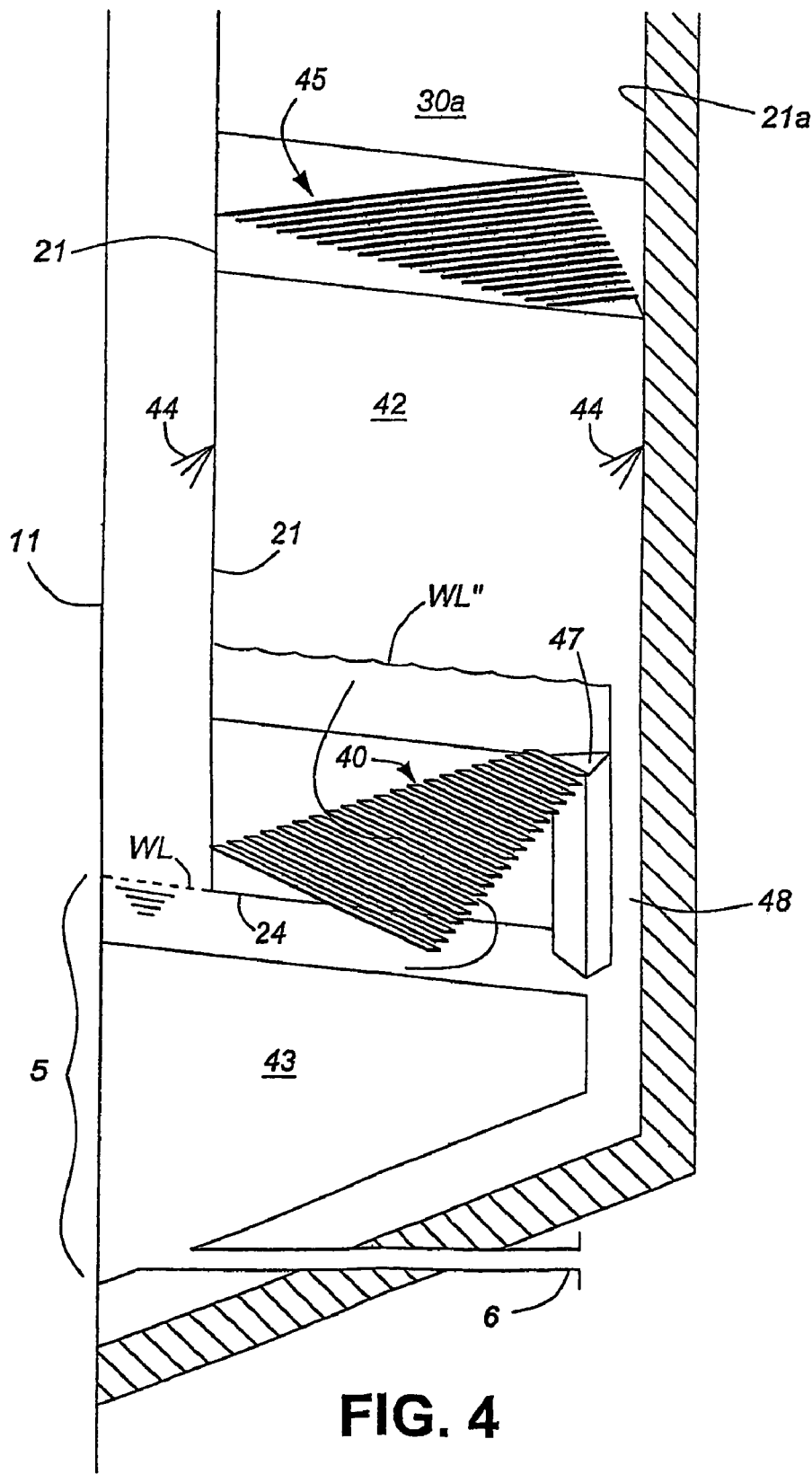
FIG. 4 is an enlarged view of the mixing zone and vanes illustrated in FIGS. 2 and 3.

As may be seen from FIGS. 2, 3, and 4, at the somewhat triangular shaped inlet end 33 of outlet plenum 30 (defined by peripheral lip 24 of the hot plenum wall 21 and outer wall 31), sets of mixing vanes 40 are interposed in the passage way to partially obstruct the passage of exhaust gases through the scrubbing liquid and into the outlet plenum. As may best be seen in FIG. 4, with reference to FIG. 3, mixing vanes 40 comprise a series of several horizontal flat vanes partially overlapping one another and spaced apart to form an inclined or stepped array through which exhaust gases are passed. The array of vanes is inclined upwardly and outwardly to force gases to reverse direction in order to pass inwardly through the spacing between the vanes. The array of vanes is submerged below the liquid level in tank 5.

Figure 5:
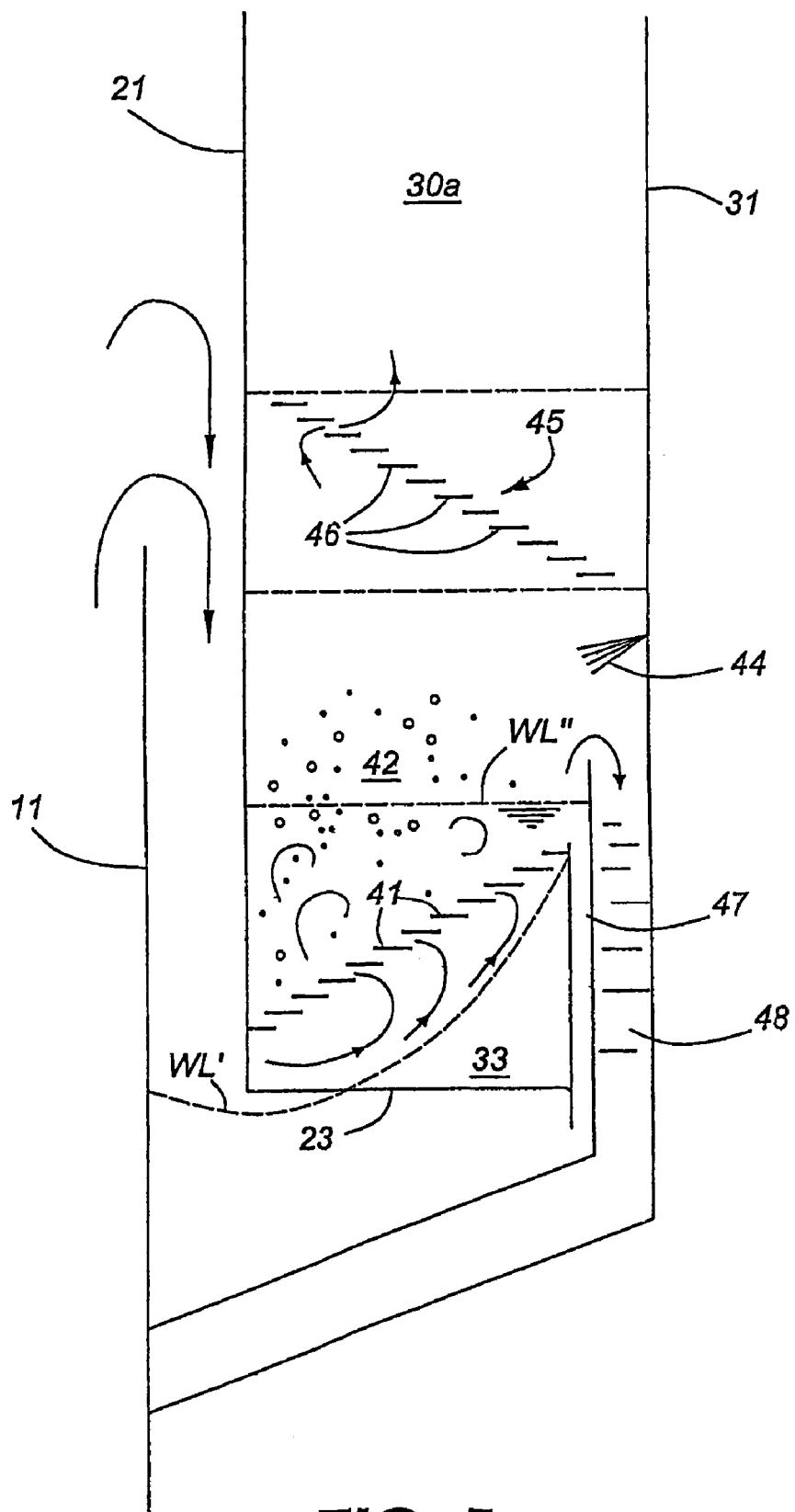
FIG. 5 is a schematic view illustrating the gas flow through the liquid bath and mixing vanes of FIG. 4.

During operation of the scrubber, the pressure of the exhaust gases on the surface of the scrubbing liquid WL causes the liquid level to depress at the exit of hot plenum 20 to a level WL' thereby raising the liquid within triangular inlet 33 of passageways 30a of outlet plenum 30 to level WL". The gases descending in hot plenum 10 then reverse direction and pass under peripheral lip 24 of the hot plenum and stream or bubble through the scrubbing liquid. The gases may even create a gas void under the array of mixing vanes, as shown by the curved liquid level WL' in FIG. 5. The exhaust gases then turn again to pass through the array of mixing vanes 40. The number of individual vanes 41 of the mixing vane array 40 depends upon the size of the scrubber system but generally range from 12 to 15 vanes. Vanes 41 may typically be ¾ inches wide in horizontal dimension, and one-eighth inch thick, with a spacing between vanes of one eighth to three quarters inch. Each vane is set back approximately 50% of its width from the vane below. The vanes cause redirection and acceleration of the gases, resulting in turbulence and formation of fine bubbles of exhaust gas within the scrubbing liquid. The resulting bubbles then proceed within mixing zone 42 of outlet plenum 30.

Particulate matter such as soot, of carbon or hydrocarbon composition, is carried down hot plenum passageway 20 and is absorbed in the scrubbing liquid, to slowly descend to the bottom of tank 5. Radial baffles 43 within the tank aid in retaining a degree of quiescence to permit settlement on the particles. Soluble gases in the exhaust stream, such as $SO_x$ and $NO_x$ are dissolved in the scrubbing liquid, not only by merely percolating through the liquid bath but principally at the liquid/gas interface of the tiny bubbles created during the turbulent, agitated flow of gases through the mixing vanes.

It will be understood that the duration of time during which the gases are immersed in scrubbing liquid, or retained within the bubbles, effects the level of dissolution of pollutant gases.

In mixing zone 42 the bubbles of exhaust gas arise above the surface of the scrubbing liquid, where they coalesce and break up. Within passageway 30 or 30a, jets or nozzles 44 may be utilized to spray scrubbing liquid into the path of the exhaust gases, further causing coalescence and break up of the bubbles of gas, while also wetting down the walls 21 and 31 of passage way 30 for further contact exchange of gas contaminants with the scrubbing liquid. If desired, similar jets may be used in the lower sections of plenum 20 to pre-wet and cool the hot exhaust gases.

Further along the passageway 30a are located a set of mist eliminator vanes 45. These vanes are designed to strip any remaining scrubbing liquid from the moisture laden, saturated stream of exhaust gases and entrained droplets. The array of mist eliminator vanes 45 is similar to and may be a mirror image of the array of mixing vanes 42. They comprise a series of overlapping staggered flat vane members 46. Each vane 46 is generally ¾ inches wide, one-eighth inch thick and spaced at one-eighth to ¾ inch separation. The spacing between vanes 46 is sufficiently close to obtain good contact between the moisture laden gases and the vanes, but sufficiently separated to avoid an increased gas velocity which may strip deposited moisture from the vanes.

The liquid stripped from the gas stream by mist eliminators 45 drains down the side walls of passageway 30a and returns to the bath 5. Ridges on the passageway walls of mixing zone 42 may be used to direct the drainage direction, and even induce further gas exchange at the surface of the walls. The scrubbing liquid (i.e. water, etc.) removed by the mist eliminators and wall contact drips into the bottom of the tank, where radial surge or wave baffles inhibit agitation and allow settlement of particulate matter. Such particulate matter and excess treating liquid may be removed from the conical bottom of the tank. The liquid may then be cooled, treated and reintroduced into the system.

Upon exiting the mist eliminator vanes, the exhaust gases have been cooled to the temperature of the scrubbing liquid of the bath 5. Typically, this will be in the order of 40° C. if recycled liquid is used. The exhaust gases are substantially depleted of suspended scrubbing liquid, but are generally 100% saturated. As may be seen from FIG. 2 and FIG. 5, after the exhaust gases have been passed through mist eliminators 45, they proceed through the balance of passages 30a, surrounded in greater part by wall 21 of hot plenum 20. Wall 21 is hot from exposure to hot exhaust gases in the range of 250°–450° C. exiting into chamber 23 from inlet passage 10. It maybe expected that walls 21 of the upper chamber 23 can be heated in the range of 250 to 300° C. by the incoming exhaust gases.

After the exhaust gases have been cooled and scrubbed in the scrubbing liquid and mixing zone, and stripped of excess liquid in the mist eliminator vanes 45, the exhaust gas stream is reduced to a saturated gas without any significant entrained liquid component. The saturated exhaust gases are then re-heated radiantly as well as by conduction and convection from the heat transfer surface of common wall 21. Depending on gas flow rates and the length of the exposed wall portion 21 of the hot plenum, the gases will be re-heated at least 30° C. and may be re-heated up to 200° C. As a result, the moisture in the exhaust gases, when exiting the exhaust plenum, will be normally well below the saturation point and typically at 75% saturation, thus eliminating or substantially reducing condensation of liquids on downstream piping, and preventing/reducing visible fogging in the atmosphere. Consequently the resulting gas emission does not display a heat signature or a visible moisture cloud, and is substantially reduced in both particulate and gaseous contaminants.

It will be understood that ideal flow rates of the exhaust gases are not always maintained, and occasional surges in flow rate will be experienced. The present invention adjusts for sudden increased flow rate by providing passage 47 extending between the bath 5 (below edge 24) and the apex of the mixing vanes 40. Further, in the event that a surge in gas flow rate forces the scrubbing liquid through the mixing vanes 40 and into mixing chamber 42, the liquid may then overflow through an annular drain 48 located at the outer perimeter of the passage way 30a as indicated by arrow D. The net effect is to make the scrubber more reliable in varying flow situations, a common problem for other wet scrubber designs.

The present design operates with a minimal back pressure or head of one to six inches of water. The overall pressure drop of the system is less than six inches of water, principally from the hydrostatic pressure of the liquid bath level.

The scrubber is an effective means for removal of $SO_2$ and particulate matter resulting from combustion of fuels, such as diesel fuel. Levels of 80% particulate removal and 95% $SO_2$ removal have been achieved by this apparatus and method It will also be apparent to one skilled in the art that a continuous flow and exchange of scrubbing liquid is required. Liquid may be introduced through the spray jets, but preferably is also introduced in a regular flow rate into bath 5 by a liquid source, not shown.

The exact exhaust gas parameters in any given situation will be determinative of the size, flow rate and temperatures used in a scrubber of the present invention. An example of one set of parameters using a star-shaped hot plenum, with the exhaust gases of a one megawatt engine (1500 horse power) are set out in the table below:

EXAMPLE #1–1500 h.p. (1 Megawatt engine)

| Inlet | length $L_1$ | 6' |
| | diameter $D_1$ | 12" |
| Hot "Star Plenum" | length $L_2$ | 9–12' |
| | inner diameter $D_2$ | 16" |
| | outer diameter $D_3$ | 44" |
| Outlet Plenum | length $L_3$ | 11'–14' |
| | diameter $D_3$ | 44" |
| Inlet Temperature | | 200°–490° C. |
| Mixing Chamber Temperature | | 40° C. |
| Outlet Temperature | | 70°–200° C. |
| Gas Flow Rate | | 1–2 kg/s |
| Liquid Re-circulation Rate | Seawater @ metric Ton/hr | 20–30 Ton/hr |
| Bath Volume | | 1 cu m = 1 tonne |

| Mixing Vanes | | | |
| --- | --- | --- | --- |
| Number | Size | Separation | Overlap |
| 15 | ¾" w 1/4" t | ½" | 50% |

A further example of scrubber parameters using a circular hot plenum, in a 7500 h.p. engine is listed below.

EXAMPLE #2 7500 h.p. (5.6 Megawatt engine)

| Inlet | length $L_1$ | 6' |
| --- | --- | --- |
| | diameter $D_1$ | 24" |
| Hot Plenum | length $L_2$ | 12' |
| | diameter $D_2$ | 45" |
| Outlet Plenum | length $L_3$ | 14' |
| | diameter $D_3$ | 60" |
| Inlet Temperature | | 480° C. |
| Mixing Chamber Temperature | | 40° C. |
| Outlet Temperature | | 70°–200° C. |
| Gas Flow Rate | | 11 kg/sec |
| Liquid Re-circulation Rate | Seawater @ metric Ton/hr | 120–130 Ton/hr |
| Bath Volume | | 2 tons |

| Mixing Vanes | | | |
| --- | --- | --- | --- |
| Number | Size | Separation | Overlap |
| 18 | 3/4" w 1/4" t | 3/4" | 50% |

The foregoing embodiments were operated with a back pressure head of 6 inches of water. The benefits of such minimized pressure head will be fully apparent to persons skilled in the art and is a dramatic improvement of other high efficiency scrubbers which employ pressure heads orders of magnitude larger.

In operation, exhaust gases ranging from 200° C. to 490° C. which include soot and reaction gases such as sulphur dioxide and nitrogen oxide, are cooled to the temperature of the scrubbing liquid bath, the particulate matter is stripped in the bath and significant percentages of sulphur dioxide are stripped from the exhaust gas stream by dissolution in the scrubbing liquid. Applicant has found that in excess of 90% of sulphur dioxide may be stripped from the exhaust gas by this invention, and 20% of $NO_x$ maybe stripped.

Such high percentage of $NO_x$ removal is in part due to the pH level of the scrubbing liquid caused by the dissolution of $SO_2$. Typically, in the example described above, the pH level is running in a range of 2–3, which is an excellent absorber of $NO_x$.

Applicant has also found that up to 90% of the soot and 20% of the hydrocarbon particulates are removed in the scrubbing liquid.

The foregoing description has been intended to indicate the nature of the invention, its operation and advantages, without being limited of size, shape, temperature or operational rates. Variations from the description and example may be readily understood by a person skilled in the art and incorporated without departing from the scope of this invention.

The invention claimed is:

1. A scrubber device for reduction of particulate and gaseous contaminants from exhaust gases comprising:
   co-axial nested inlet conduit, hot conduit, and outlet conduit for counterflow passage of the exhaust gases,
   a tank containing a bath of scrubbing liquid, wherein ends of the hot and outlet conduits are operatively interconnected and immersed in the scrubbing liquid within the tank whereby the exhaust gases pass through the liquid bath,
   one or more sets of mixing vanes, and
   one or more sets of horizontal mist eliminator vanes,
   wherein said mixing vanes, are located within the immersed end of the outlet conduit, and are adapted to generate turbulence in the exhaust gases to form very small bubbles,
   and wherein said mist eliminator vanes are located in the outlet conduit downstream of the mixing vanes, and are adapted to remove droplet and mist from the exhaust gases.

2. The scrubber of claim 1 wherein the hot conduit and outlet conduits have a common wall portion remote from the immersed ends.

3. The scrubber of claim 2 wherein the common wall portion, is a heat exchanger to warm the exhaust gases flowing through the outlet conduit.

4. The scrubber of claim 1 wherein each set of mixing vanes comprises an inclined array of thin, flat, elongated vanes, spaced apart and offset transversely from the adjacent vanes.

5. The scrubber of claim 4 wherein each set of mixing vanes is inclined radially outwardly.

6. The scrubber of claim 1 wherein each set of mist eliminator vanes comprises an inclined array of thin, flat, horizontal elongated vanes, spaced apart and offset transversely from the adjacent vanes.

7. The scrubber of claim 6 wherein the array of mist eliminator vanes is inclined radially inwardly.

8. The scrubber of claim 1 which includes a central inlet conduit nested within and operatively interconnected with the surrounding hot conduit.

9. The scrubber of claim 4 wherein sprayers for spraying the scrubbing liquid into the exhaust gases are located between the set of mixing vanes and the set of mist eliminator vanes.

10. The scrubber of claim 3 wherein the heat exchanger provides sufficient re-heat to the exhaust gases to elevate the exhaust gas temperature beyond the dew point by at least 30° C.

11. The scrubber of claim 2 wherein the common wall portion has a circular cross-section.

12. The scrubber of claim 2 wherein the common wall portion has a multi-lobed cross-section.

13. The scrubber of claim 12 in which the common wall portion is generally star-shaped.

14. The scrubber of claim 1 wherein operating back pressure is less than six inches of water.

15. A method of scrubbing a stream of exhaust gases to reduce particulate and gaseous contaminants and to reduce the exhaust gas temperature comprising,
   (a) passing exhaust gases from a source through an elongated inlet conduit;
   (b) passing the exhaust gases in a counter-flow direction through a hot conduit surrounding the inlet conduit;
   (c) passing the exhaust gases through a liquid bath to cool the gases and retain particulate matter;
   (d) passing the exhaust gases in a counter-flow direction into an outlet conduit surrounding the hot conduit and having at least a partial common wall with the hot conduit;
   (e) passing the exhaust gases through one or more sets of mixing vanes adapted to redirect the gas stream direction and generate turbulence in the liquid bath, whereby fine bubbles are generated and entrained in the gas stream
   (f) passing the exhaust gases through one or more sets of mist eliminator vanes to substantially eliminate any entrained bubbles or moisture;

(g) passing the exhaust gases along a heated surface of said common wall to raise the temperature of the exhaust gases above the dew point; and (h) exhausting the exhaust gases from the scrubber.

16. The method of claim 15 whereby, in step (e), tiny bubbles of exhaust gases are formed by roiling and swirling turbulence generated by passing the exhaust gases through an inclined array of submerged mixing vanes.

17. The method of claim 15, including, after step (e), passing the exhaust gases and entrained bubbles through a spray passage to dissipate the bubbles.

18. The method of claim 15 whereby, in step (f), the mist eliminator vanes are spaced so as to contact the gas stream and strip moisture therefrom, while preventing an increase in velocity of the gas stream which would re-entrain moisture from the vanes.

19. The method of claim 15 whereby, in step (g), the exhaust gases are heated in the outlet conduit by heat transferred through the common wall portion from exhaust gases within the hot conduit.

20. The method of claim 19 wherein the temperature of the exhaust gases is raised at least 30° C. above the dew point.

* * * * *